United States Patent [19]
Ohtomo et al.

[11] Patent Number: 5,389,714
[45] Date of Patent: Feb. 14, 1995

[54] BLENDS OF POLYPHENYLPHENE ETHER, POLYAMIDE, ELASTOMERIC SUBSTANCES AND NEEDLE SHAPED TITANIUM OXIDE TREATED WITH ORGANOPOLYSILOXANES

[75] Inventors: Takashi Ohtomo, Utsunomiya; Hiromi Ishida, Moka; Hidekazu Kabaya, Moka; Hiroshi Kubo, Moka, all of Japan

[73] Assignee: GE Plastics, Japan, Ltd., Tokyo, Japan

[21] Appl. No.: 995,498

[22] Filed: Dec. 23, 1992

[30] Foreign Application Priority Data

Dec. 27, 1991 [JP]  Japan .................................. 3-360389

[51] Int. Cl.⁶ ..................... C08K 3/22; C08L 71/12; C08L 77/06
[52] U.S. Cl. ..................... 524/497; 523/212; 523/213; 525/66; 525/68; 525/92; 525/133; 525/396; 525/397

[58] Field of Search ............... 525/68, 92, 66, 133, 525/396, 397; 524/497; 523/212, 213

[56] References Cited

U.S. PATENT DOCUMENTS

| | | | |
|---|---|---|---|
| 5,001,181 | 3/1991 | Takagi et al. | 525/397 |
| 5,204,395 | 4/1993 | Lupinski | 523/212 |
| 5,219,940 | 6/1993 | Nakano | 525/133 |

FOREIGN PATENT DOCUMENTS 1103649  4/1989  Japan .

Primary Examiner—James J. Seidleck
Assistant Examiner—Thomas Hamilton, III

[57] ABSTRACT

Resin compositions comprising (A) polyethylene ether resins, (B) polyamide resins, (C) elastomeric substances, and (D) needle-shaped titanium oxide are disclosed. The disclosed resins exhibit an excellent balance of stiffness and impact resistance, low linear coefficient of expansion, and good heat resistance, oil resistance, forming processability and molding surface appearance.

13 Claims, No Drawings

BLENDS OF POLYPHENYLPHENE ETHER, POLYAMIDE, ELASTOMERIC SUBSTANCES AND NEEDLE SHAPED TITANIUM OXIDE TREATED WITH ORGANOPOLYSILOXANES

INDUSTRIAL FIELD OF APPLICATION

The present invention relates to resin compositions containing polyphenylene ether resins and polyamide resins. Specifically, it relates to thermoplastic resin compositions which contain needle-shaped titanium oxide of a particular shape with modified surfaces, and which show an excellent balance of stiffness and impact resistance, low linear coefficient of expansion, and good heat distortion resistance, oil resistance, forming processability, and molding surface appearance.

BACKGROUND OF THE INVENTION

Resin compositions comprising polyphenylene ether resins and polyamide resins have excellent heat resistance, forming processability, oil resistance, and organic solvent resistance. Resin compositions of this type which also contain elastomeric substances show excellent impact resistance. As a result, they have been used in automobile parts, electric and electronic parts, machine parts, etc., and are promising materials for use in various fields. However, because they contain polyamide resins, they have the drawback of dimensional change and lowering of elastic modulus due to moisture absorption. This is a particularly serious problem in applications such as automobile exterior body panels, which require high stiffness, dimensional stability, and impact resistance.

In order to increase their dimensional stability and stiffness, thermoplastic resins are often compounded with powders or flakes of inorganic fillers such as calcium carbonate, talc, mica, etc., or fibrous inorganic fillers such as glass fibers, carbon fibers, potassium titanate whiskers, etc.

It is possible to improve the dimensional stability of resin compositions by incorporating fillers such as calcium carbonate, mica, etc. for less mold shrinkage and lower linear coefficient of expansion. However, the increase in stiffness obtained in this way is inadequate, and the resulting material is more brittle, with lower impact strength. Glass fibers have poor alkali resistance, and so there are limitations on the applications of moldings containing them. Carbon fibers are easily obtained as long fibers, and show good chemical resistance, but they are expensive, and not very economical. Resin compositions incorporating these sorts of fibrous reinforcing agents also have other drawbacks, such as showing substantial anisotropy, having rough surfaces with low gloss, and causing severe wear to processing equipment and molds. Potassium titanate fibers, a more recent development, are easily obtained in the form of relatively long fibers, and show good chemical resistance, but because they are easily broken they cannot provide the reinforcing effect one would expect from their nominal fiber length. At times there is also some impairment of the plastic properties because potassium is present as a component. Potassium titanate fibers are sometimes used to impart color to the plastic as well, but because their coloring power is low they inevitably have to be added in large amounts, and this can actually result in lower strength, besides being uneconomical.

In order to overcome these drawbacks, needle-shaped titanium oxide has been used to fill thermoplastic resins, as described in Japanese Early Patent Disclosure Publication No. 1-103649. However, because those are very fine inorganic fibers with high aspect ratios, they easily become entangled with each other. The entanglement is not adequately broken when they are incorporated into resins, and as a result, products molded from those compositions tend to have fine bumps and depressions on their surfaces. In addition, the surface activity of the needle-shaped material is higher than that of granular titanium dioxide, and this can lead to molecular weight reduction in resins such as polycarbonates or polyamides. Consequently, these fillers cannot be used without surface treatment. When they are surface treated with silane coupling agents or titanate coupling agents as described in Japanese Early Patent Disclosure Publication No. 1-103649, their reinforcing effect increases, but there are also the problems that the melt flow of the resulting resin compositions is impaired, and the tendency toward surface roughening is even greater since it is difficult to disentangle the fibers.

SUMMARY OF THE INVENTION

The present invention has as its object to provide thermoplastic resin compositions with a good balance of stiffness and impact resistance, low linear coefficient of expansion, and good heat distortion resistance, oil resistance, forming processability, and molding surface appearance.

The present inventors have found that this object can be accomplished by filling thermoplastic resins comprising polyphenylene ether resins and polyamide resins with needle-shaped titanium oxide of a certain shape whose surfaces have been treated with organopolysiloxanes. That discovery has led to the present invention.

The present invention thus consists of resin compositions characterized in that they contain:

(A) 5–80 wt. parts polyphenylene ether resins,
(B) 95–20 wt. parts polyamide resins,
(C) 0–50 wt. parts, per 100 wt. parts (A) and (B), elastomeric substances, and
(D) 1–50 wt. parts, per 100 wt. parts (A) and (B) and (C), organopolysiloxane surface-treated needle-shaped titanium oxide having average particle length not greater than 5 μm, and long axis/short axis aspect ratio not less than 3.

The polyphenylene ether (hereinafter "PPE") resins used in the present invention may be known PPE resins, such as those represented by the general formula:

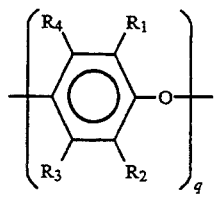

(where $R_1$, $R_2$, $R_3$, and $R_4$ are each independently a hydrogen atom, halogen atom, alkyl group, alkoxy group, or monovalent substituent group selected from haloalkyl and haloalkoxy groups having at least two carbon atoms between the halogen atom and the phenyl ring and not having tertiary α-carbon atoms; and q is an integer representing the degree of polymerization). It may be a polymer consisting of just one type, or a copolymer of two or more types of units represented by the above general formula. In preferred examples, $R_1$ and $R_2$ are alkyl groups having 1–4 carbon atoms, while $R_3$ and $R_4$ are hydrogen atoms or alkyl groups having 1–4 carbon atoms. Examples include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, etc. Examples of PPE copolymers include those in which part of the repeating units are formed from trialkyl phenols, such as 2,3,6-trimethylphenol. The PPEs may also be copolymers having styrenic compounds grafted onto them. Examples of such styrenic compound-grafted PPEs include those obtained by graft copolymerization of styrenic compounds such as styrene, α-methylstyrene, vinyltoluene, or chlorostyrene onto the types of PPEs described above.

In the present invention, in order to increase the compatibility of the PPE and polyamide, part or all of the above PPEs may be replaced by PPEs modified to introduce terminal groups that react with amino groups, such as epoxy groups, carboxy groups, or acid anhydride groups. The formation of epoxy, carboxy, or acid anhydride terminal groups on the PPEs may be accomplished by known methods.

The formation of epoxy terminal groups is described, for example, in Japanese Early Patent Disclosure Publication No. 63-125525. Epoxy-terminated PPEs can be obtained by contacting the PPE with a substance having epoxy groups while heating them. Preferred examples of compounds having epoxy groups include epoxy compounds having a halogen group at one end, and epoxy compounds having epoxy groups at both ends. Specific examples of preferred compounds having an epoxy group at one end include epichlorohydrin, 2-methylepichlorohydrin, etc. Preferred examples of compounds having epoxy groups at both ends include 2,2-bis(4-glycidyl phenyl ether)propane, epoxy resins, etc. From the standpoint of inhibiting block formation between pairs of PPEs, compounds having an epoxy group at one end are particularly preferred.

The formation of carboxyl or acid anhydride terminal groups is described, for example, in Japanese Patent Publication No. 62-400456. PPEs having carboxyl or acid anhydride terminal groups are obtained by reaction of a PPE with a carboxy or anhydride group-containing acid chloride, such as trimellitic anhydride chloride.

These modified PPEs need not necessarily have all of their terminal groups modified. The proportion of unmodified terminal groups is preferably not more than 70 wt % of the total amount of the PPE component (A).

The polyamides used as component (B) in the present invention are usually formed by condensation of linear diamines represented by the formula

$H_2N-(CH_2)_x-NH_2$ (where x is an integer between 4 and 12) with linear carboxylic acids represented by the formula

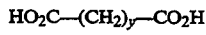
$HO_2C-(CH_2)_y-CO_2H$ (where y is an integer between 2 and 12), or else by ring-opening polymerization of lactams. Preferred examples of such polyamides include nylon 6,6, nylon 6,9, nylon 6,10, nylon 6,12, nylon 6, nylon 12, nylon 11, nylon 4,6, etc.

Copolymerized polyamides, such as nylon 6/6,6, nylon 6/6,10, nylon 6/12, nylon 6/6,12, nylon 6/6,6/6,10, nylon 6/6,6/12, etc., may also be used.

Additional examples include nylon 6/6, T (where T refers to a terephthalic acid component), semiaromatic polyamides obtained from aromatic dicarboxylic acids and m-xylylenediamine or alicyclic diamines, polyamides obtained from m-xylylenediamine and linear carboxylic acids of the type described above, polyesteramides, polyether-amides, and polyester-ether-amides. A single polyamide or a combination of two or more polyamides may be used.

In order to improve the compatibility of the PPE with the polyamide, resin compositions in accordance with the present invention may also contain added compatibilizing agents. Examples of compatibilizers which can be used include the unsaturated carboxylic acids or derivatives thereof described in Japanese Early Patent Disclosure Publication No. 56-26913, and the saturated aliphatic polycarboxylic acids described in Japanese Early Patent Disclosure Publication No. 61-502195.

The unsaturated carboxylic acids or their derivatives referred to above are compounds having (a) carbon-carbon double or triple bonds and (b) carboxy, acid anhydride, amide, imide, carboxylate ester, or epoxy groups, in the same molecule. Examples include maleic anhydride, maleic acid, fumaric acid, maleimide, maleic acid hydrazide, maleic anhydride-diamine reaction products having structures such as

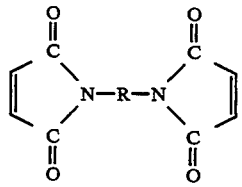

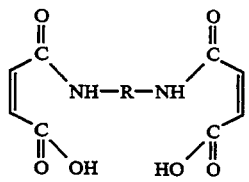

(where R is an aliphatic or aromatic group), methylnadic anhydride, dichloromaleic anhydride, maleamide, soybean oil, tung oil, castor oil, linseed oil, hempseed oil, cottonseed oil, sesame oil, other vegetable oils, peanut oil, camellia oil, olive oil, palm oil, sardine oil, other natural oils, epoxidized soybean oil and other epoxidized natural oils, acrylic acid, butenoic acid, crotonic acid, vinylacetic acid, methacrylic acid, pentenoic acid, angelic acid, tibric acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinolic acid, eleostearic acid, oleic acid, eicosapentaenoic acid, erushinic acid, docosadienoic acid, docosatrienoic acid, docosatetraenoic acid, docosapentaenoic acid, tetracosenoic acid, hexacosenoic acid, hexacodienoic acid, octacosenoic acid, traakontenoic acid, and other unsaturated carboxylic acids, as well as esters, amides, and anhydrides of such unsaturated carboxylic acids, adducts of maleic anhydride or phenols with oligomers (e.g., molecular weigh 500–10,000) or high polymers (e.g., molecular weight over 10,000) of butadiene, isoprene, etc., and similar polymers which have been modified to introduce carboxy groups, epoxy groups, etc.

Examples of the saturated aliphatic polycarboxylic acids or derivatives thereof referred to above include compounds represented by the formula

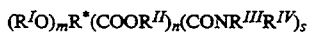

where R* is a linear or branched saturated aliphatic hydrocarbyl group having 2–20 carbon atoms, preferably 2–10 carbon atoms, $R^I$ is a hydrogen atom or an alkyl, aryl, acyl, or carbonyldioxy group (having 1–10 carbon atoms, preferably 1–6 carbon atoms, more preferably 1–4 carbon atoms), most preferably a hydrogen atom, $R^{II}$ is a hydrogen atom or an alkyl or aryl group (having 1–20 carbon atoms, preferably 1–10 carbon atoms), $R^{III}$ and $R^{IV}$ are hydrogen atoms or alkyl or aryl groups (having 1–10 carbon atoms, preferably 1–6 carbon atoms, more preferably 1–4 carbon atoms), $m = 1$, $n + s \geq 2$, preferably $n + s = 2$ or 3, $n \geq 0$, $S \geq 0$, and the ($R^I O$) groups are located in $\alpha$ or $\beta$ positions with respect to the carbonyl groups, and at least one pair of carbonyl groups has 2–6 carbon atoms between them.

The saturated aliphatic polycarboxylic acid derivatives referred to include esters, amides, anhydrides, hydrates, and salts of saturated aliphatic polycarboxylic acids.

Examples of saturated aliphatic polycarboxylic acids include citric acid, malic acid, agaricic acid, etc. Esters of such acids include citric acid acetyl ester, monostearyl ester, distearyl ester, etc. Amides include citric acid N,N'-diethylamide, N,N'-dipropylamide, N-phenylamide, N-dodecylamide, and N,N'-didodecylamide, malic acid N-dodecylamide, etc. Salts include potassium salts, calcium salts, etc.

Compatibilizing agents such as these may be used singly or in combinations of two or more.

The elastomeric substances used as component (C) may include natural and synthetic polymeric substances which are elastomers at room temperature. Specific examples include natural rubber, butadiene polymers, styrene-isoprene copolymers, butadiene-styrene copolymers (including random copolymers, block copolymers, graft copolymers, etc.), isoprene polymers, chlorobutadiene polymers, butadiene-acrylonitrile copolymers, isobutylene polymers, isobutylene-butadiene copolymers, isobutylene-isoprene copolymers, acrylate ester polymers, ethylene-propylene copolymers, ethylene-propylene-diene copolymers, Thiokol rubbers, polysulfide rubbers, polyurethane rubbers, polyether rubbers (e.g., polypropylene oxide), epichlorohydrin rubber, etc.

The elastomeric substances used may be produced by any polymerization method (e.g., emulsion polymerization, solution polymerization) using any catalyst (e.g., peroxides, trialkyl aluminum, lithium halides, nickel-containing catalysts). They may have various degrees of crosslinking and various proportions of different microstructures (e.g., cis structures, trans structures, vinyl groups, etc.), as well as various average rubber particle sizes. Copolymers of whatever type (random copolymers, block copolymers, graft copolymers, etc.) may be used. The production of these elastomeric substances may also involve copolymerization with monomers such as other olefins, dienes, aromatic vinyl compounds, acrylic acid, acrylate esters, methacrylate esters, etc. Such copolymerization may be random copolymerization, block copolymerization, graft copolymerization, etc. Specific examples of such monomers include ethylene, propylene, styrene, chlorostyrene, $\alpha$-methylstyrene, butadiene, isobutylene, chlorobutadiene, butene, methyl acrylate, acrylic acid, ethyl acrylate, butyl acrylate, methyl methacrylate, acrylonitrile, etc. It is also possible to use partially modified elastomeric substances, such as hydroxy- or carboxy-terminated polybutadiene, partially hydrogenated styrene-butadiene block copolymers, partially hydrogenated styrene-isoprene block copolymers, etc.

The needle-shaped titanium oxide used as component (D) in the present invention has essentially the composition $TiO_2$, in the form of needles. Here the term "needle-shaped" includes similar shapes such as fibers, rods, etc. The particles of this shape should have an average length of up to 5 $\mu$m, preferably not more than 3 $\mu$m, and the ratio of their measurements in the long and short directions should be at least 3, preferably at least 5. There is no particular upper limit on the aspect ratio, but in readily available materials it is usually less than 50. The average length of the particles should not exceed 5 $\mu$m since if it does, there will be excessive fiber entanglement. Recently, it has been pointed out that fibrous materials such as asbestos fibers may be carcinogenic as a result of their shapes (Stanton-Pott hypothesis; e.g., *J. Natl. Cancer Int.*, 58, 587–603 (1977); *J. Natl. Cancer Int.*, 67, 965–975 (9181); *Proc. WHO/IRAC Conf.*, 1982, 2, 286–302 (1984); "Asubesuto Daitai no Subete [Compendium of Asbestos Substitutes]," edited by the Japan Environmental Center, 211–284 (1989)). From the standpoint of these health considerations it is undesirable to use fine fibers having average lengths in excess of 5 $\mu$m. Because the needle-shaped titanium oxide in the present invention consists of 100% rutile crystals, it shows high hardness and resistance to breakage, as well as good chemical resistance and heat resistance.

Needle-shaped titanium oxide may be obtained, for example, by mixing rutile $TiO_x$ with alkali metal salts such as sodium chloride and oxyphosphorus compounds, then calcining at 725°–1000° C., as described in Japanese Patent Publication No. 47-44974, or by mixing a $TiO_x$ source with zinc compounds, alkali metal compounds, and phosphate compounds, then calcining, as in Japanese Patent Publication No. 45-18370. When the needle-shaped titanium oxide is obtained as a mixture of long and short particles, it is preferably subjected to fractional pulverization so that at least 70 wt % of its particles measure 0.02–0.5 μm in the short direction and 0.5–5 μm in the long direction. It is usually desirable to remove soluble salts from the needle-shaped titanium oxide thus obtained, by a process such as extraction in water after calcining. It is difficult to achieve complete removal of soluble salts, however. The needle-shaped titanium oxide used in the present invention may contain small amounts of impurities.

It has also been proposed to use fibrous titanium oxide obtained by treating potassium titanate fibers in acidic aqueous solutions to extract the potassium component. However, it is difficult to remove enough of the potassium by such a method, and the resulting fibrous titanium oxide often cannot maintain its original fiber form. In particular, it tends to become porous, so that the strength of the fibers is drastically reduced, and they are easily broken. Consequently they are not suitable for use as a reinforcing agent in resin compositions in accordance with the present invention.

The organopolysiloxanes used for surface modification of the needle-shaped titanium oxide are preferably organopolysiloxane polymers having Si—H bonds in their molecules. The organic groups may be, for example, alkyl or phenyl groups. Of the various alkyl groups, methyl groups are particularly preferred, but they may also be ethyl, propyl, other lower alkyl groups, or a combination of two or more different alkyl groups. Such compounds include alkyl hydrogen siloxane homopolymers, siloxane copolymers having mainly dialkyl siloxane units and alkyl hydrogen siloxane units, etc. More preferred are dimethyl polysiloxanes in which part or all of the dimethyl siloxane units are replaced with methyl hydrogen siloxane units. Such compounds are commercially available, for example, from Toshiba Silicone Ltd. under the trade name TSF 484. Linear dialkyl (or phenyl) polysiloxanes which are sold as ordinary silicone oils having no Si—H groups can also be used. The alkyl groups are preferably methyl groups, but they may also be ethyl, propyl, or other lower alkyl groups.

The amount of organopolysiloxanes used should be in the range of 0.1–10 wt. parts, preferably 0.5–5 wt. parts, per 100 wt. parts of needle-shaped titanium oxide. If the amount is less than 0.1 wt. part, there will be little dispersion-enhancing effect on the titanium oxide, so the particles will tend to lump together, and their full effect in improving the flow of the resin composition will not be realized. On the other hand, if the amount exceeds 10 wt. parts, the dispersion-enhancing effect will no longer increase in proportion to the amount used, and the heat resistance and stiffness of molded products will tend to be impaired.

Treatment of the surfaces of the needle-shaped titanium oxide with organopolysiloxanes may be accomplished, for example, by first stirring the needle-shaped titanium oxide in water, breaking up the lumps formed by entanglement of fibers, then adding the organopolysiloxane to the stirred suspension of needle-shaped titanium oxide in water, and continuing stirring for a few minutes to a few hours. There is no particular restriction on the organopolysiloxane used or the rate at which it is added, but water-soluble organopolysiloxanes are particularly suitable for such a wet process since they are more readily dispersed in water. Once its surfaces have been modified in this way, the needle-shaped titanium oxide can be separated by known means, such as centrifuging, and then dried to obtain the desired surface-modified needle-shaped titanium oxide.

The surface-modified needle-shaped titanium oxide used in the present invention may also be obtained by a dry method, in which the organopolysiloxane is sprayed or added to needle-shaped titanium oxide in a high-speed mixer such as a Henschel mixer.

The organopolysiloxane may be used in combination with other surface-treating agents if desired, so long as they do not interfere with the object of the present invention. The other surface-treating agents may be, for example, silane coupling agents, titanate coupling agents, finely powdered silica, higher fatty acids, higher alcohols, waxes, etc.

The proportions of the PPE component (A) and the polyamide component (B) should be 5–80 wt. parts (A) to 95–20 wt. parts (B), preferably 20–70 wt. parts (A) to 80–30 wt. parts (B).

If less than 5 wt. parts of component (A) and more than 95 wt. parts of component (B) are used, the heat resistance of the resulting composition will be low, and its stiffness and dimensional stability can be greatly impaired by absorption of moisture. On the other hand, if the amount of component (A) exceeds 80 wt. parts while less than 20 wt. parts of component (B) is used, the impact resistance and forming processability of the composition will be poor. An elastomeric substance is optionally added as component (C) in order to improve the impact resistance of the composition, but if the amount used exceeds 50 wt. parts per 100 wt. parts of components (A) and (B) combined, the heat distortion temperature, strength, and stiffness of the composition will be much lower.

The amount of needle-shaped titanium oxide added as component (D) should be 1–50 wt. parts, preferably 5–40 wt. parts, per 100 wt. parts of components (A), (B), and (C) combined. If the amount is below this range it will be difficult to obtain the desired improvements in stiffness, dimensional stability, etc. If the amount is above this range, the impact resistance of the composition will be impaired, it will be difficult to disperse it all in melt mixing equipment, and the flow of the composition will be so poor that it will be hard to mold under ordinary conditions.

Compositions in accordance with the present invention may also optionally contain other reinforcing agents and fillers besides the needle-shaped titanium oxide, in amounts which do not interfere with the effect of this invention. Examples include glass fibers, carbon fibers, metal fibers, silicon carbide whiskers, potassium titanate whiskers, gypsum fibers, mica, talc, calcium silicate (wollastonite), kaolin, clay, calcium sulfate, calcium carbonate, silicon oxide, (granular) titanium oxide, etc.

In addition, depending on the intended application, one or more of the usual additives, such as antioxidants, heat stabilizers, ultraviolet absorbers, lubricants, mold release agents, flame retardants, antistatic agents, dyes, and/or pigments, may be added during mixing of the resins or during molding.

There is no particular restriction on the process used to produce the resin component of the present invention; ordinary methods can be satisfactorily used. For example, the desired amounts of components (A), (B), (C), (D), and any optional additives may be mixed, then kneaded in a kneader to prepare the composition. Or metered amounts of components (A), (B), (C), and any optional additives may be fed to an extruder and kneaded, and after the resin has been melted the surface-treated needle-shaped titanium oxide may be added as a side feed and kneaded in to prepare the composition. Or the surface-treated needle-shaped titanium oxide and component (B) may be kneaded first in an extruder to form a masterbatch, which is added as a side feed to a melt-kneaded mixture of components (A), (C), and any optional additives, then further kneaded to prepare the composition. The kneading equipment used may be of any kind that is capable of kneading the resins with the needle-shaped titanium oxide, such as an extruder, a Banbury mixer, a kneader, etc. In the case of an extruder, one can use a single or multiple screw extruder or a screwless device such as an elastic extruder, hydrodynamic extruder, ram-type continuous extruder, roll extruder, gear extruder, etc. However, screw extruders, in particular twin-screw extruders, are preferred.

The present invention will now be described in greater detail by means of some examples, although the invention is by no means limited to the examples listed here.

DETAILED DESCRIPTION OF THE PREFERRED EMBODIMENTS

The following compounds were used in these examples and comparisons.
Component (A): PPE
 Poly(2,6-dimethyl-1,4-phenylene) ether having intrinsic viscosity (chloroform, 25° C.) 0.48 dL/g
Component (B): PA
 PA-1: Nylon 6 having relative viscosity 2.6 (number-average molecular weight 13,000), terminal amino group content 0.079 mequiv/g, melting point 220° C.
 PA-2: Arlen Neat Resin (trademark of Mitsui Petrochemical Industries), a polyamide formed by condensation of hexamethylenediamine with terephthalic acid and adipic acid, having relative viscosity 1.04 dL/g, melting point 312° C., glass transition temperature 83° C., and terminal amino group content 0.099 mequiv/g
Component (C): (Optional)
 SEBS: KRATON G1651 (trademark, produced by Shell Chemical Co., hydrogenated styrene-ethylene-butadiene-styrene copolymer)
Component (D): Needle-Shaped Titanium Oxide
 FTL-200 (Trademark, produced by Ishihara Sangyo, average particle size: long direction 1.7 μm, short direction 0.16 μm) surface-treated with TSF 484 (trademark, produced by Toshiba Silicone Co., methyl hydrogen polysiloxane, viscosity 25 cSt at 25° C.)
Components for Comparison:
 FTL-200S: FTL-200 surface-treated with an aminosilane coupling agent
 FTL-200ES: FTL-200 surface-treated with an epoxysilane coupling agent
Compatibilizer: Citric acid

EXAMPLES 1–4

Comparisons 1–6

Pretreatment of the needle-shaped titanium oxide with the organopolysiloxane was performed by the dry method (using a Supermixer). The amount (wt. parts) listed in Table 1 of methyl hydrogen polysiloxane was added little by little to the amount listed in Table 1 of needle-shaped titanium oxide, and mixed at high speed for 5 minutes.

The amounts (wt. parts) of each component listed in Table 1 were mixed and fed to a vacuum-vented twin-screw extruder at 290° C. (320° C. in Example 4), and extruded to form pellets. The pellets were fed to an injection-molding machine operating at cylinder temperature 280° C. (320° C. in Example 4), injection pressure 80 kg/cm², and mold temperature 60° C. to form specimens which were then tested for various properties.

In these examples and comparisons, the various properties were measured by the following methods.
Melt Index (MI):
 ASTM D1238 standard method, at 280° C. and 5 kg load
 (320° C. and 5 kg load in Example 4)
Tensile Properties (Strength TS and Elongation TE):
 ASTM D638
Flexural Modulus (FM):
 ASTM D790
Heat Distortion Temperature (HDT):
 ASTM-D648 standard method (with 4.6 kg/cm² load)
Notched Izod Impact Strength (NII):
 ASTM D256
High-Speed Impact Properties:
 50-mm square molded plates were punched at a fixed velocity of 5 m/sec at room temperature. The number of specimens was N=5, and each was examined after punching to determine whether ductile (D) or brittle (B) failure had occurred.
Linear Coefficient of Expansion (CTE):
 calculated from the measured change in dimensions of a 100×1000-mm test specimen from −30° C. to 80° C.
Surface Appearance:
 The surfaces of 50-mm square molded plates were examined with the naked eye and with an optical stereo microscope at a magnification of 20.
 ⊙ very good (glossy, smooth)
 ○ good (somewhat glossy, or slightly rough)
 Δ rather poor (numerous rough spots)
 × poor (visibly rough)
The results of these tests are listed in Table 1.

TABLE 1

| | Examples | | | | Comparisons | | | | | |
|---|---|---|---|---|---|---|---|---|---|---|
| | 1 | 2 | 3 | 4 | 1 | 2 | 3 | 4 | 5 | 6 |
| PPE | 30 | 25 | 25 | 25 | 25 | 25 | 25 | 25 | 25 | 25 |
| SEBS | 10 | 10 | 10 | 10 | 10 | 10 | 10 | 10 | 10 | 10 |
| Citric Acid | 1 | 1 | 1 | 1 | 1 | 1 | 1 | 1 | 1 | 1 |
| PA-1 | 50 | 40 | 40 | | 40 | 40 | 40 | 40 | 40 | 40 |
| PA-2 | | | | 40 | | | | | | |
| FTL-200 | 10 | 25 | 15 | | | | | 25 | | |
| FTL-200S | | | | | | | | | 25 | |
| FTL-200ES | | | | | | | | | | 25 |

TABLE 1-continued

| | Examples | | | | Comparisons | | | | | |
|---|---|---|---|---|---|---|---|---|---|---|
| | 1 | 2 | 3 | 4 | 1 | 2 | 3 | 4 | 5 | 6 |
| TSF484 | 0.1 | 0.25 | 0.15 | 0.25 | | | | | | |
| Talc | | | 10 | | 25 | | | | | |
| Glass Fibers | | | | | | 25 | | | | |
| Potassium Titanate Fibers | | | | | | | 25 | | | |
| NII | 41 | 22 | 16 | 18 | 8 | 4 | 20 | 18 | 25 | 23 |
| High-Speed Impact (5 m/s) | D | D | D | D | B | B | D | D/B | D | D |
| TS | 560 | 630 | 620 | 690 | 610 | 720 | 625 | 570 | 650 | 660 |
| TE | 80 | 55 | 40 | 35 | 20 | 8 | 40 | 20 | 50 | 45 |
| FM ($\times 10^3$) | 36 | 42 | 43 | 49 | 44 | 52 | 39 | 38 | 44 | 45 |
| HDT | 194 | 196 | 196 | 218 | 198 | 201 | 195 | 195 | 198 | 198 |
| MI | 22 | 16 | 18 | 13 | 19 | 15 | 17 | 48 | 4 | 3 |
| CTE(1/°C. $\times 10^{-5}$) | 5.1 | 4.6 | 4.8 | 3.1 | 6.4 | 5.5 | 4.9 | 4.7 | 4.5 | 4.5 |
| Surface Appearance | ⊚ | ⊚ | ⊚ | ⊚ | ○ | X | Δ | ○ | ○ | ○ |

Talc, glass fibers, and potassium titanate fibers were used for comparison. The talc had average particle size 1.7 μm, the glass fibers had average diameter 10 μm and average length 3 mm, and the potassium titanate fibers had average diameter 0.3 μm and average length 15 μm.

When talc was added (Comparison 1), the impact resistance of the material was poor. When glass fibers were added (Comparison 2), the impact resistance and the surface appearance were poor. When potassium titanate fibers were added (Comparison 3), there was some improvement in mechanical properties, but the surface appearance was poor as clumps of fibers caused substantial surface roughness.

Comparisons 4 and 5 were experiments using needle-shaped titanium oxide without the organopolysiloxane surface treatment or with a different surface-treating agent. When untreated needle-shaped titanium oxide was used (Comparison 4), degradation of the polyamide resin was accelerated, causing a large increase in melt flow, accompanied by a loss of mechanical properties. When other surface-treating agents were used (Comparisons 5 and 6), the mechanical strength increased but there was a marked decline in melt flow and the surfaces appeared rough.

In contrast, in the examples of the present invention, surface treatment of the needle-shaped titanium oxide with the organopolysiloxane resulted in better dispersion in the resin and less resin degradation, making it possible to obtain resin compositions with excellent dimensional stability and surface appearance, and increased stiffness, without sacrificing the good impact resistance of PPE/(rubber)/polyamide resin blends.

Thermoplastic resin compositions in accordance with the present invention show an excellent balance of stiffness and impact resistance, with low linear coefficient of expansion and good heat resistance, oil resistance, forming processability, and molding surface appearance. As a result, they are industrially very useful, capable of a wide range of applications.

Furthermore, because they use needle-shaped titanium oxide having an average particle length of 5 μm or less, they are also useful from the standpoint of health and safety.

We claim:

1. Resin compositions characterized in that they contain:
   (A) 5-80 wt. parts polyphenylene ether resins,
   (B) 95-20 wt. parts polyamide resins,
   (C) 0-50 wt. parts, per 100 wt. parts (A) and (B), elastomeric substances, and
   (D) 1-50 wt. parts, per 100 wt. parts (A) and (B) and (C), organopolysiloxane surface-treated needle-shaped titanium oxide having average particle length not greater than 5 μm, and long axis/short axis aspect ratio not less than 3.

2. A resin composition comprising
   (A) polyphenylene ether resins,
   (B) polyamide resins;
   (C) elastomeric substances; and
   (D) needle-shaped titanium oxide treated with an organopolysiloxane.

3. A composition according to claim 2 wherein said titanium oxide has an average particle length not greater than 5 μm, and a long axis/short axis aspect ratio of not less than 3.

4. A composition according to claim 2 wherein said organopolysiloxane is selected from the group consisting of alkyl hydrogen siloxane homopolymers, dialkyl-/alkyl hydrogen siloxane copolymers, and dimethyl-/methyl hydrogen polysiloxanes.

5. A composition according to claim 2 wherein said organopolysiloxane comprises from about 0.1-10 parts by weight per 100 weight parts of said titanium oxide.

6. A composition according to claim 2 wherein said polyphenylene ether resins have the formula

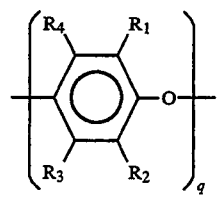

where $R_1$, $R_2$, $R_3$, and $R_4$ are each independently a hydrogen atom, halogen atom, alkyl group, alkoxy group, or monovalent substituent group selected from haloalkyl and haloalkoxy groups having at least two carbon atoms between the halogen atom and the phenyl ring and not having tertiary α-carbon atoms; and q is an integer representing the degree of polymerization.

7. A composition according to claim 6 wherein said polyphenylene ether resins are modified to introduce terminal groups selected from the group comprising epoxy groups, carboxy groups and acid anhydride groups.

8. A composition according to claim 2 wherein said polyamide resin is formed by the condensation of linear diamines with linear carboxylic acids.

9. A composition according to claim 8 wherein said polyamide resin is selected from the group consisting of nylon 6,6, nylon 6,9, nylon 6,10, nylon 6,12, nylon 6, nylon 12, nylon 11, nylon 4,6, nylon 6/6,6, nylon 6/6,10, nylon 6/12, nylon 6/6,12, nylon 6/6,6/6,10, nylon 6/6,6/12, nylon 6/6,T (where T represents a terephthalic acid component), semiaromatic polyamides, polyester-amides, polyether-amides, polyester-ether-amides, and mixtures thereof.

10. A composition according to claim 2 further comprising a compatibilizing agent selected from the group consisting of unsaturated carboxylic acids, derivatives thereof, saturated aliphatic polycarboxylic acids, and mixtures thereof.

11. A composition according to claim 2 wherein said elastomeric substances are selected from the group consisting of natural rubber, butadiene polymers, styrene-isoprene copolymers, butadiene-styrene copolymers, butadiene-acrylonitrile copolymers, isobutylene polymers, isobutylene-butadiene copolymers, isobutylene-isoprene copolymers, acrylate ester polymers, ethylene-propylene copolymers, ethylene-propylene-diene copolymers, Thiokol rubbers, polysulfide rubbers, polyurethane rubbers, polyether rubbers, epichlorohydrin rubber and mixtures thereof.

12. A composition according to claim 2 wherein said titanium oxide it $TiO_2$.

13. A resin composition comprising
   (A) from about 5–80 parts by weight of polyphenylene ether resins;
   (B) from about 95–20 parts by weight of polyamide resins;
   (C) from about 0–50 parts by weight of elastomeric substances; and
   (D) from about 1–50 parts by weight of needle-shaped titanium oxide treated with an organopolysiloxane.

* * * * *